United States Patent [19]

Fretter

[11] Patent Number: 4,700,845

[45] Date of Patent: Oct. 20, 1987

[54] BICYCLE STORAGE SYSTEM

[76] Inventor: Richard B. Fretter, 482 Boynton Ave., Berkeley, Calif. 94707

[21] Appl. No.: 796,936

[22] Filed: Nov. 12, 1985

[51] Int. Cl.$^4$ .............................................. A47F 7/00
[52] U.S. Cl. ........................................ 211/18; 211/5; 211/17
[58] Field of Search ................... 211/18, 5, 17, 19, 22, 211/20

[56] References Cited

U.S. PATENT DOCUMENTS

| 158,476 | 1/1875 | Dorr | 211/94 |
|---|---|---|---|
| 586,681 | 7/1897 | Douglas | 211/19 |
| 621,072 | 3/1899 | Gregory | 211/5 |
| 3,411,633 | 11/1968 | Magnuson | 211/13 |
| 3,944,079 | 3/1976 | Boslough | 211/5 |
| 4,343,404 | 8/1982 | Folsom | 211/17 |
| 4,374,498 | 2/1983 | Yellin | 211/182 X |

FOREIGN PATENT DOCUMENTS 318401  2/1957  Switzerland ........................ 248/307

Primary Examiner—Ramon S. Britts
Assistant Examiner—Sarah A. Lechok Eley
Attorney, Agent, or Firm—Flehr, Hohbach, Test, Albritton & Herbert

[57] ABSTRACT

A bicycle storage rack comprises a two-point bicycle hanging system or, alternatively, a three-point immobilizing suspension system. The hanging and suspension points can be moved reciprocally relative to one another and rotated in two directions to accommodate virtually any bicycle frame size and configuration. Also, a wedge is provided for immobilizing the front wheel.

6 Claims, 9 Drawing Figures

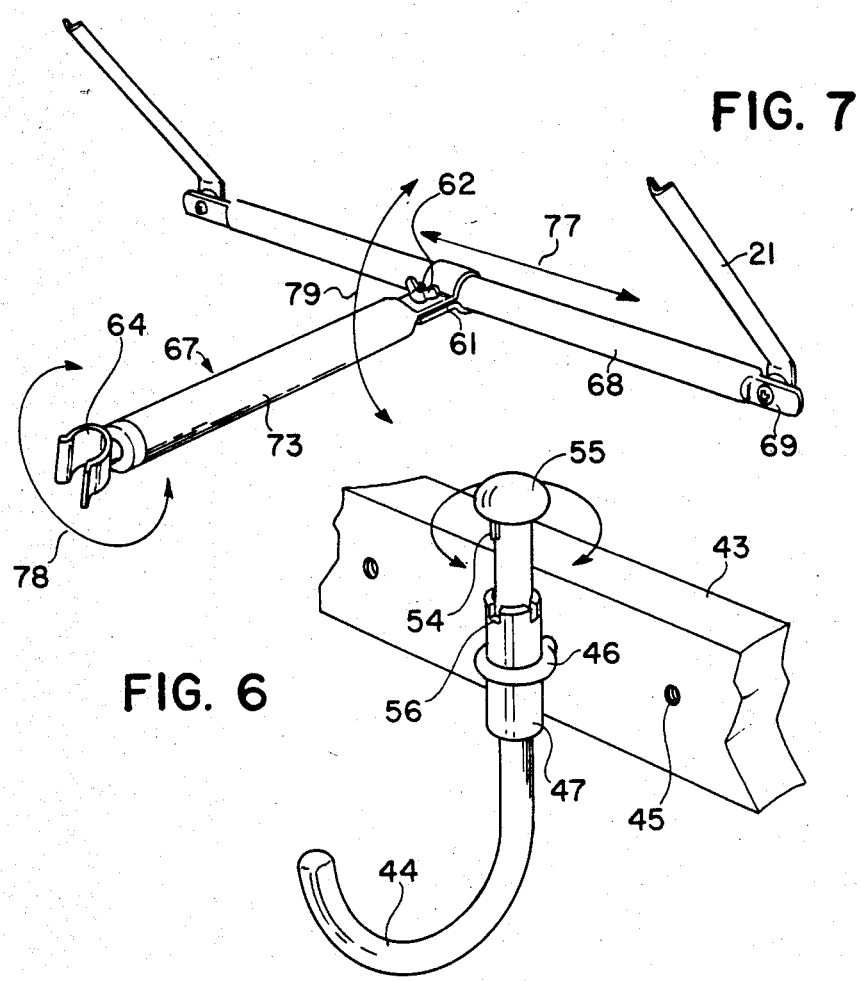
FIG. 7
FIG. 6
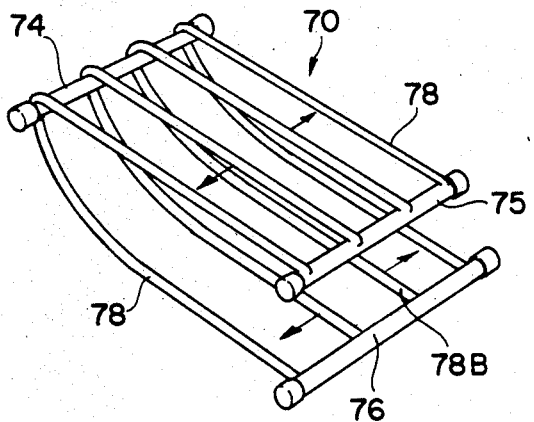
FIG. 8
FIG. 9

BICYCLE STORAGE SYSTEM

BACKGROUND OF THE INVENTION

The present invention relates to bicycle storage systems and devices and, in particular, to a bicycle support rack which serves the functions of storing bicycles and accessories and of supporting bicycles for maintenance.

Conventionally, bicycles are stored off the ground using L-shaped hooks or, usually, J-shaped hooks. Typically, the hooks are threaded at one end and are mounted to studs or other sturdy elements in much the same way that lag bolts are mounted. One or two hooks are used. When the bicycle is stored using one hook, the hook is screwed into a wall or stud at sufficient height to allow the bicycle to hang vertically by one wheel. The bicycle must then be lifted and rotated 90° so that the wheel can be hung over the hook.

Where two hooks are used, the bicycle must be turned upside down for hanging. If bicycles of different sizes are to be stored, it may be necessary to unscrew and remount the hooks using a different spacing.

There are also available wheel clamps which attach to the bicycle frame and pivot downward to engage and immobilize the wheel.

SUMMARY OF THE INVENTION

It is one object of the present invention to provide a bicycle storage rack which stores bicycles without requiring that the bicycles be rotated.

It is also an object of the present invention to provide a bicycle storage rack which can be readily adjusted to mount bicycles of different sizes without remounting the rack itself.

It is another object of the present invention to provide a bicycle storage rack which immobilizes the hanging bicycle to permit maintenance or repair.

In one aspect, the bicycle storage rack of the present invention comprises a shelf having a front edge or lip which is adapted for mounting hooks at spaced positions; a pair of hook assemblies; first and second mounting brackets at the rear of the shelf; and a pair of braces mounted at an angle to the shelf and extending downward and rearward from the front of the shelf and forming mounting points at their bottom end which, in combination with the brackets, are used to mount the shelf to an external support such as a wall.

In another aspect, each hook assembly comprises a sleeve which is adapted for mounting to the shelf and has at least one positioning slot therein, and a J-shaped hook within the sleeve having a mating stud at or near the upper end thereof.

In still another aspect, my storage rack provides a three-point bicycle suspension system in which the third suspension point is provided by a clamp assembly comprising a support bar which is adapted for mounting to the braces or the external support such as a wall; a rod which extends forward from the support bar and is mounted to the bar for rotation or for sliding movement along the bar or both; and clamping means mounted at the forward end of the rod for clamping to the bicycle. Preferably, the clamping means is mounted to the rod for rotation to provide an additional degree of freedom and adaptation to different bicycle sizes and configurations.

In still another aspect, my invention relates to a wedge which includes a plurality of generally U-shaped spring elements joined at their end and middle to frame elements such as rods for positioning between the bicycle front wheel and the bicycle frame to prevent the fork tube and handlebars from turning.

BRIEF DESCRIPTION OF THE DRAWINGS

The above and other aspects of the invention are described with respect to the attached drawings, in which:

FIG. 6 is slightly enlarged perspective view of one of the bicycle hanging hooks shown in FIG. 2;

FIG. 7 illustrates an alternative embodiment of the clamping assembly shown in FIGS. 1 and 2 which provides the optional third suspension point for my bicycle storage rack;

FIG. 8 depicts a wedge which is used to immobilize the front wheel of a bicycle; and FIG. 9 illustrates the use of the wedge of FIG. 8.

DETAILED DESCRIPTION OF THE INVENTION

Figure 1:
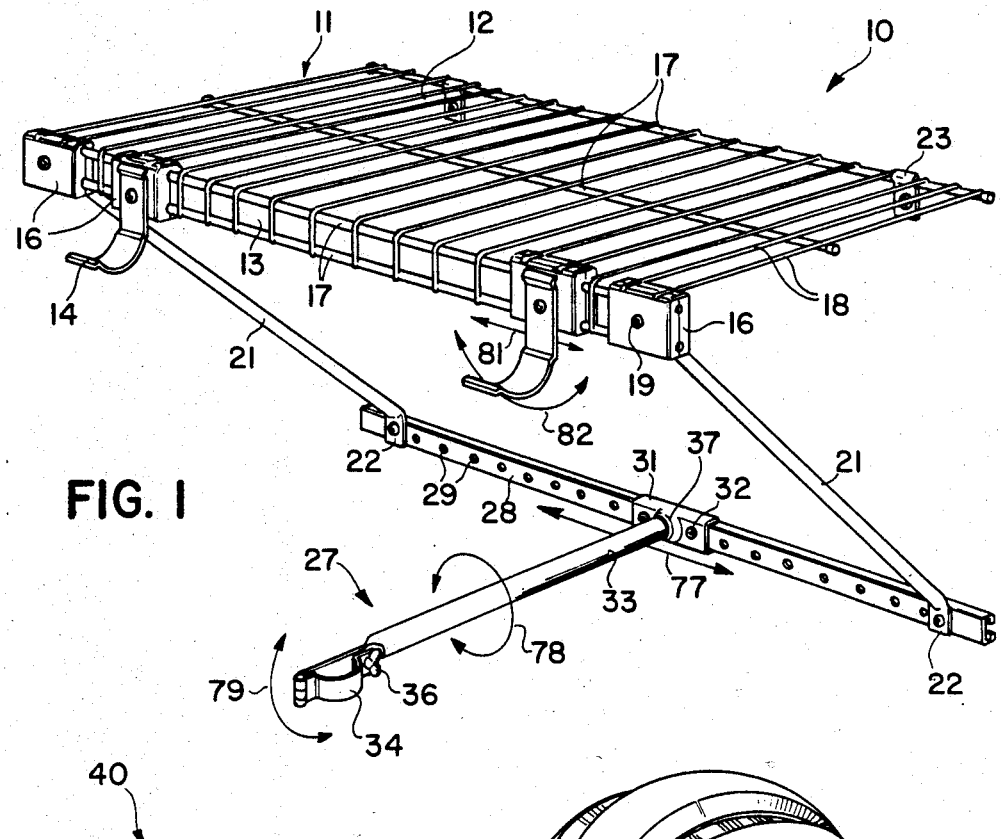
FIG. 1 is a perspective view of one embodiment of a bicycle storage rack which embodies my invention.
Figure 2:
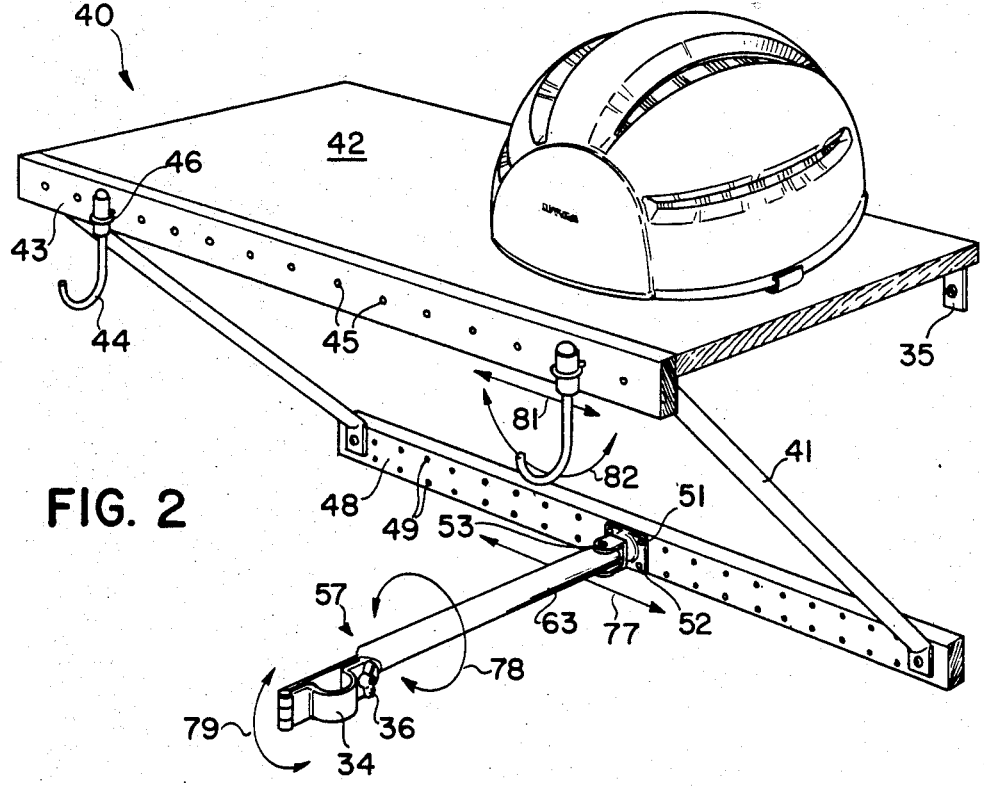
FIG. 2 is a perspective view of a bicycle rack which is an alternative embodiment of my invention.

FIG. 1 depicts one embodiment 10 of my bicycle storage rack. The rack 10 includes a shelf unit 11 which itself includes a shelf 12 and a front lip 13. As shown in FIG. 2, the shelf 12 may be used to store accessory articles. The rack components also include a pair of generally J-shaped hooks 14—14, each of which is mounted to a joiner plate assembly 16. Each joiner plate 16 comprises front and rear plates which fit over upper and lower front longitudinal rods 17—17 which define the lip 13. Typically, the shelf assembly comprises a plurality of generally parallel, spaced, transverse rods 18—18 joined to four of the longitudinal rods 17—17 which form the frame of the shelf unit. Each hook 14 is attached for rotation to its joiner plate assembly 16 by a screw 19 and nut (not shown), which also clamp the joiner plates together to the lip 13. A pair of braces 21—21 are attached by the screws 19—19 to the rear of the joiner plates 16—16 and extend downwardly at an angle from the plates, terminating in flat lower ends 22. Also, a pair of brackets 23—23 are clipped over the rear rod 17. The shelf assembly is mounted by the upper brackets 23 and lower brace ends 22 to studs or to a wall or other sturdy support using four screws or bolts. The shelf unit 11, the joiner plate assembly 16 and the braces 21 are standard commercially available components of plastic-coated rod-type closet storage units.

Figure 3:
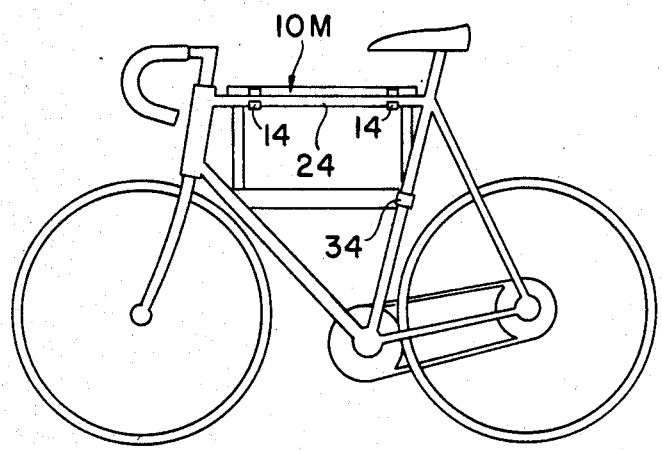
FIG. 3 illustrates the use of my bicycle storage rack to hang a man's bicycle.
Figure 4:
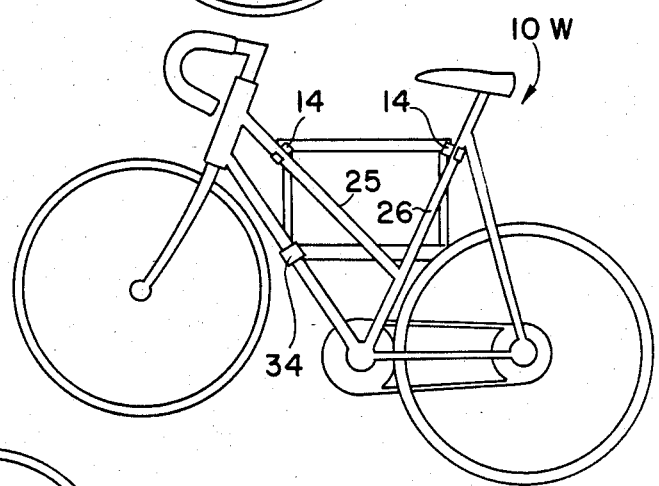
FIG. 4 illustrates the use of my bicycle storage rack to hang a woman's bicycle.
Figure 5:
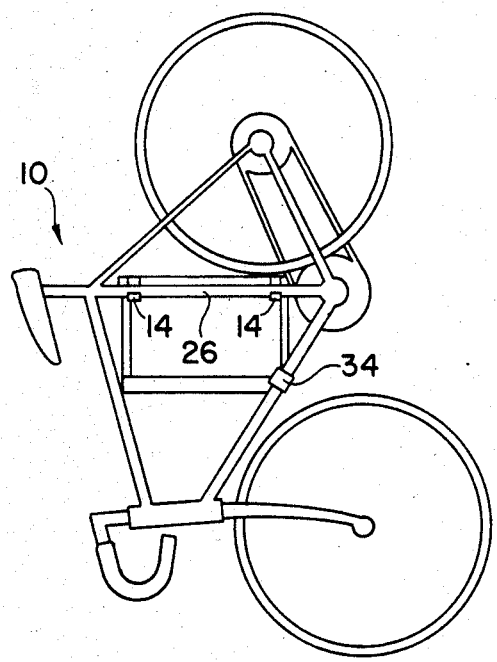
FIG. 5 illustrates the use of my bicycle storage rack to hang a bicycle vertically.

Referring to FIG. 3, the two swivel hooks 14—14 can be used to hang a Diamond frame bicycle 10M by its top or horizontal frame tube 24. As shown in FIG. 4, the swivel hooks 14 can be pivoted as required to hang a Mixte bicycle 10W horizontally by the frame tube 25 and seat tube 26. Also, as shown in FIG. 5, either type of bicycle can be hung vertically by the seat tube 26.

Referring again to FIG. 1, my bicycle storage rack 10 can also include an optional third suspension point in the form of a clamp assembly 27. Use of the clamp assembly 27 provides a secure, three-point bicycle suspension system which immobilizes a bicycle hung thereon off the floor at working height, for example, so that repairs can be made to the bicycle or so that other maintenance can be performed. The clamp assembly 27 includes an apertured bottom support bar 28 having spaced holes 29—29. The bar 28 is mounted to the bottom ends 22 of brace 21 (actually, the brace mounting screws are used to attach both the brace 21 and the bar 28 to the stud or wall or other support). Alternatively, but less conveniently, the bar 28 can be mounted to the wall or support separately from the braces 21. Bracket or base 31 fits over the support bar 28. The bracket 31 contains holes 32—32 which are spaced the same distance as the bar holes 29—29 so that the bracket can be attached anywhere along the length of the bar 28. Rod 33 is attached at one end by a journal fitting 37 to base 31. A hinged clamp 34 is pivotally mounted at the opposite, front end of the rod by wing nut 36.

One section of the hinge 34 is curved to fit over bicycle frame tubes. The mating inner ends of the hinge sections are clamped together and mounted to the rod 33 by the wing nut 36 to securely mount the clamp over the bicycle tube. The three degrees of freedom provided by the longitudinal positioning of the base 31 (see arrow 77), the rotation of rod 33 (arrow 78) and the orthogonal rotation of the hinged clamp 34 (arrow 79), together with the transverse positioning of the hooks 14 (arrow 81) and the rotation of the hooks (arrow 82) provide a three-point suspension system which attaches at selected points to a bicycle frame and can accommodate essentially any bicycle size and frame configuration. The reader's attention is directed again to FIGS. 3, 4 and 5 wherein the clamping assembly 27 and clamp 34 are used with the two hooks 14 to provide a three-point immobilizing suspension system which accommodates essentially any bicycle size and configuration.

FIG. 2 depicts an alternative embodiment 40 of my bicycle storage rack which functions similarly to the rack 10, FIG. 1. Rack 40 comprises a solid shelf 42 of wood or any other suitable material and a front lip 43 which is formed integrally with or attached to the front edge of the shelf 42. This shelf unit is mounted to a wall or other support by braces 41 which are attached to the front of the shelf 42 or to the lip 43, and by brackets such as 35 which are attached to the rear of the shelf.

Referring also to FIG. 6, a pair of J-hooks 44 are selectively mounted at holes 45-45 in the front lip 43 by eye screws 46. The hooks are part of an assembly that includes slotted sleeve 47, which fits within and is joined to the eye screw 46. The J-shaped hook 44 fits slidably within the sleeve 47 and preferably includes a stud 54 near the head 55 thereof which mates within spaced grooves 56 in the sleeve. Consequently, the hook 44 can be positioned facing forward for hanging a bicycle, or to the side or the rear safely out of the way. The hooks 44 are similar to the hooks 14, FIG. 1, in that they can be pivoted on mounting screws 46 and can be mounted in different positions along the lip 43 to accommodate different bicycle frame sizes and configurations.

An alternative, interchangeable clamp assembly 57 is shown in FIG. 2. The clamp assembly 57 comprises a support bar 48 of wood or other suitable material which has upper and lower rows of holes 49 formed therein for mounting a base 51 using screws 52. A U-shaped bracket 53 is rotatably journaled to the base 51 and mounts rod 63 at one end. The rod 63 in turn mounts the hinged clamp 34 at the opposite, front end thereof. The clamp assembly 57 is positioned and pivotable in the same manner as assembly 27, FIG. 1, and thus also readily accommodates virtually any bicycle size and configuration.

Another alternative clamping assembly 67 is shown in FIG. 7. The clamping assembly 67 comprises a mounting tube 68 having flat ends for mounting to the bicycle storage rack braces 21 or 41. Clamp 61 is mounted over the tube 68 and is readily positioned anywhere along the length of the tube and then clamped to the tube by wing nut 62. Rod 73 is secured at a first, flattened end to the clamp 61 by the wing nut 62. A U-shaped spring clip 64 is rotatably journaled to the opposite front end of the tube 73 for clamping to a bicycle frame tube.

Although the components of the clamp assembly 67 differ from those of clamp assemblies 27 and 57, the assembly 67 also possesses three types of movement. the first is the transverse positioning movement of the clamp 61 along the support bar 68 (see arrow 77). The second movement is rotational movement of the spring clamp 64 due to its journal mounting to the rod 73 (see arrow 78). In the clamp assemblies 27 and 57 substantially similar movement 78 is provided by the rotational mounting of the respective rods 33 and 63 to bases 31 and 51. The third movement 79 is provided by the rotation of the bar 73 on the rod 68. In clamp assemblies 27 and 57, the clamp 34 provides similar pivotal movement 79 by virtue of its mounting to the wing nut 36. While all three types of positioning movement (the transverse positioning movement and the two rotational movements) are not necessary to enjoy the versatility of the present invention (in particular, rotational movement 79 about the mounting bar is believed to be the least necessary of the three types of movements), nonetheless, the three types of movement are readily incorporated in my bicycle storage rack as described above.

FIGS. 8 and 9 illustrate a wedge 70 which can be used in conjunction with a bicycle storage rack or separately to immobilize fork tube 79 and the front wheels 71 of a bicycle relative to its frame 72. In a preferred embodiment, three rods form the frame of the wedge: front rod 74 and upper and lower rear rods 75 and 76. Resilient U-shaped rods 78 are bent or otherwise formed in a generally U-shaped configuration and are joined to the rods 74-76 at the middle and ends. The rods 78 (for example, the two bottom portions 78B of the middle rods) can be bent outwardly to position the wedge over the wheel 71. The inherent spring action of the rods 78 biases the wedge against the wheel 71 and the frame 72 to immobilize the fork tube 79 and front wheel relative to the frame, i.e., to prevent turning of the fork tube.

Those of usual skill in the art will readily derive other modifications of my bicycle storage rack which are within the scope of the invention disclosed above and defined in the following claims.

I claim:

1. A bicycle storage rack comprising a pair of hooks; a storage shelf having a front edge or lip adapted for mounting the hooks at a number of spaced positions for hanging a bicycle and having first and second brackets mounted toward the rear edge thereof for providing first and second points for mounting the bicycle rack to an external support such as a wall; a pair of angled braces mounted at one end toward the front edge of the shelf and extending downward and rearward to form third and fourth mounting points for mounting the bicycle rack to an external support such as a wall; support means comprising a support bar adapted for mounting to the ends of the brace or to an external support; a base adapted for mounting at selected positions along the length of the support bar; a rod rotatably mounted at a first end thereof to, and extending forward from, the base, the axis of rotation being transverse to the length of the support bar; and clamping means pivotally mounted adjacent the opposite end of the rod for mounting to a bicycle at a third suspension point, the pivot axis being transverse to the rotation axis.

2. A bicycle storage rack comprising a pair of hooks; a storage shelf having a front edge or lip adapted for mounting the hooks at a number of spaced positions for hanging a bicycle and having first and second brackets mounted toward the rear edge thereof for providing first and second points for mounting the bicycle rack to an external support such as a wall; a pair of angled braces mounted at one end toward the front edge of the shelf and extending downward and rearward to form third and fourth mounting points for mounting the bicycle rack to an external support such as a wall; support means comprising a support bar adapted for mounting to the ends of the brace or to an external support; a clamp slidably mounted on the support bar for selected positioning along the support bar and for rotation in a first direction about the support bar; a rod mounted at one end to, and extending forward from the rotatable clamp; and clamping means mounted at the opposite end of the rod for rotation transverse to the first direction for mounting to a bicycle at a third suspension point.

3. A bicycle storage rack comprising a pair of hooks; a storage shelf having a front edge or lip adapted for mounting the hooks at a number of spaced positions for hanging a bicycle and having first and second brackets mounted toward the rear edge thereof for providing first and second points for mounting the bicycle rack to an external support such as a wall; a pair of angled braces mounted at one end toward the front edge of the shelf and extending downward and rearward to form third and fourth mounting points for mounting the bicycle rack to an external support such as a wall; each hook comprising a sleeve adapted for mounting to the front edge or lip of the shelf and having a least one positioning slot therein, and a J-shaped hook having a mating stud adjacent or near the upper end thereof; support means comprising a support bar adapted for mounting to the ends of the brace or to an external support; a base adapted for mounting at selected positions along the length of the support bar; a rod rotatably mounted to, and extending forward from, the base, the axis of rotation being transverse to the length of the support bar; and clamping means pivotally mounted adjacent the opposite end of the rod for mounting to a bicycle at a third suspension point, the pivot axis being transverse to the rotation axis.

4. A bicycle storage rack comprising a pair of hooks; a storage shelf having a front edge or lip adapted for mounting the hooks at a number of spaced positions for hanging a bicycle and having first and second brackets mounted toward the rear edge thereof for providing first and second points for mounting the bicycle rack to an external support such as a wall; a pair of angled braces mounted at one end toward the front edge of the shelf and extending downward and rearward to form third and fourth mounting points for mounting the bicycle rack to an external support such as a wall; each hook comprising a sleeve adapted for mounting to the front edge or lip of the shelf and having a least one positioning slot therein, and a J-shaped hook having a mating stud adjacent or near the upper end thereof; support means comprising a support bar adapted for mounting to the ends of the brace or to an external support; a clamp slidably mounted on the support bar for selected positioning along the support bar and for rotation in a first direction about the support bar; a rod rotatably mounted at one end to, and extending forward from the clamp; and clamping means mounted at the opposite end of the rod for rotation transverse to the first direction for mounting to a bicycle at a third suspension point.

5. Components for a bicycle storage rack system comprising:
a pair of hook assemblies;
a storage shelf having a front edge or lip adapted for mounting the hooks at a number of spaced positions for hanging a bicycle and having first and second brackets mounted toward the rear edge thereof for providing first and second points for mounting the bicycle rack to an external support such as a wall;
each hook assembly comprising a sleeve adapted for mounting to the front edge or lip of the shelf and having at least one positioning slot therein, and a hook having a mating stud adjacent or near the upper end thereof;
a pair of braces adapted for mounting at one end to the shelf for extending downward and rearward to form third and fourth mounting points for mounting the bicycle rack to an external support such as a wall; and
support means comprising a support bar adapted for mounting to the ends of the braces or separately to an external support; a rod rotatably mounted on, and extending forward from, the support bar, the rotation being in a first direction; and clamping means mounted at the opposite end of the rod for rotation in a direction transverse to the first direction, for mounting to a bicycle at a third suspension point.

6. The bicycle storage rack components of claim 5, wherein the bicycle has a fork tube or similar mounting component supporting a front wheel, and wherein the storage rack further includes a wedge comprising a plurality of generally U-shaped spring elements joined at their ends and middle to three transversely extending frame elements such as rods for positioning between a bicycle front wheel and frame to immobilize the fork tube and wheel.

* * * * *